United States Patent [19]
Gauronski et al.

[11] Patent Number: 5,467,449
[45] Date of Patent: Nov. 14, 1995

[54] FAULT CLEARANCE AND RECOVERY IN AN ELECTRONIC REPROGRAPHIC SYSTEM

[75] Inventors: John F. Gauronski; Kurt T. Knodt, both of Rochester, N.Y.

[73] Assignee: Xerox Corporation, Stamford, Conn.

[21] Appl. No.: 380,919

[22] Filed: Jan. 31, 1995

Related U.S. Application Data

[63] Continuation of Ser. No. 208,071, Mar. 9, 1994, abandoned, which is a continuation of Ser. No. 589,630, Sep. 28, 1990, abandoned.

[51] Int. Cl.$^6$ .................................................. G06F 11/34
[52] U.S. Cl. .................. 395/185.1; 391/181; 355/206; 355/207
[58] Field of Search .................... 371/16.4, 16.5, 371/17, 29.1; 355/203, 206, 207

[56] References Cited

U.S. PATENT DOCUMENTS

| | | | |
|---|---|---|---|
| 4,327,993 | 5/1982 | Gauronski et al. | 355/14 SH |
| 4,338,023 | 7/1982 | McGibbon | 355/14 |
| 4,514,846 | 4/1985 | Federico et al. | 371/16 |
| 4,583,834 | 4/1986 | Tani et al. | 355/14 C |
| 4,589,090 | 5/1986 | Downing et al. | 364/900 |
| 4,789,985 | 12/1988 | Akohoshi et al. | 371/11 |
| 4,839,895 | 6/1989 | Makita | 371/16 |
| 4,876,606 | 10/1989 | Banno et al. | 358/434 |
| 4,944,031 | 7/1990 | Yoshino et al. | 355/206 |
| 4,961,088 | 10/1990 | Gilliland et al. | 355/206 |
| 4,967,337 | 10/1990 | English et al. | 371/17 |
| 5,010,551 | 4/1991 | Goldsmith et al. | 355/206 |
| 5,063,535 | 11/1991 | Jacobs et al. | 371/16.5 |
| 5,179,410 | 1/1993 | Farrell et al. | 355/207 |
| 5,200,958 | 4/1993 | Hamilton et al. | 371/16.4 |

FOREIGN PATENT DOCUMENTS

| | | |
|---|---|---|
| 0376473 | 4/1990 | European Pat. Off. . |
| 3327905 | 9/1984 | Germany . |
| 3922115 | 11/1990 | Germany . |
| 2166619 | 5/1986 | United Kingdom . |

*Primary Examiner*—Robert W. Beausoliel, Jr.
*Assistant Examiner*—T. Tu
*Attorney, Agent, or Firm*—Oliff & Berridge

[57] ABSTRACT

A fault clearance and recovery operation in an electronic reprographic system comprises storing in memory clearance and recovery instructions for specific system faults, monitoring the system for fault occurrence and accessing displaying the stored instructions upon detection of a fault occurrence. Faults having similar recovery features are classified into buckets to facilitate the clearance and recovery operations.

21 Claims, 21 Drawing Sheets

FIG. 7

| Level of Information required by Operator relative to Object Faults ||
|---|---|
| Object Fault Type | Level of Information Required |
| Object faulted in the Print Queue because a Print Function Feature Required by the Object is not available. | Need to be able to identify the specific function feature which caused the Object to fault:<br>- Finisher totally not available.<br>- Stitcher not available.<br>- Binder not available.<br>- Signature Printing not available.<br>- Loopback feature not available (unable to print complex images in job).<br>- Cannot access net to get file required by job. |
| Something about the object prevents a function from continuing an operation on the object. | - If the entire Object is bad, the only requirement is to inform the operator that the object must be deleted.<br>- If a given page of an object is bad, the information available must identify the location of the page(s) in the job that are bad (i.e. pg. #2 is bad). Note: There is no requirement to update the faulted page identifier if the operator rearranges the order of the pages while in Job Review/Edit.<br>- If an operator selectable image wihtin a page is bad, the operator must be provided with a means to determine the name of image that is bad. |
| Object faulted because it was removed from a function in a partially processed state. | Need to be able to identify the specific operation that is partially completed:<br>- Batch rotate partially complete.<br>- Specific Edit mode operations that are partially complete. |
| Object faults because of invalid programming parameters which were detected after the object entered the system. | Need to be able to identify the exact conflict condition that has occurred. |

System Fault Bucket Selection Chart

| Fault Prevents System from completing the boot process | Fault Clearance and Recovery Attempt would pose risk to the operator or system | Continued Operation in current state would pose risk to the operator or system | Operator Assistance is Required to attempt fault clearance and/or recovery or an Automatic Clearance and Recovery attempt failed | Type of Display Capability available after fault is detected | Event Bucket Selection |
|---|---|---|---|---|---|
| YES | ∅ | ∅ | ∅ | NONE | 1 |
| YES | ∅ | ∅ | ∅ | RDM | 2 |
| NO | YES | ∅ | ∅ | FULL | 3 |
| NO | NO | YES | ∅ | FULL | 4 |
| NO | NO | NO | NO | FULL | 5 or 6 |
| NO | NO | NO | YES | FULL | 7, 8, or 9 |

∅ = Don't Care.

Note: System Fault Bucket #10 is a special Recovery Fault which may have to be declared as a secondary fault after a successful clearance and recovery of buckets #1-9.

FIG. 11

Function Fault Bucket Selection Chart

| Fault Clearance and Recovery Attempt would pose risk to the operator or system ? | Function Availability after fault (Totally Unavailable or Degraded) | Fault Clearance and/or Recovery attempt would cause other functions to suspend operation for > 8-10 second time period ? | Operator Assistance is Required to attempt fault clearance and/or recovery or an Automatic Clearance and Recovery attempt failed ? | Event Bucket Selection |
|---|---|---|---|---|
| YES | Unavailable | Ø | Ø | 11 |
| YES | Degraded | Ø | Ø | 12 |
| NO | Unavailable | YES | Ø | 13 |
| NO | Degraded | YES | Ø | 14 |
| NO | Ø | NO | NO | 15 |
| NO | Unavailable | NO | YES | 16, 18, or 20 |
| NO | Degraded | NO | YES | 17 or 19 |

Ø = Don't Care.

FIG. 12A

| CASE # | LAST IIT TASK? | UDH REMAINED CLOSED SINCE LAST SCAN? | CURRENT UDH COVER STATE? | DOCUMENT SENSED IN THE SLOT? | UNSCANNED DOCUMENTS SENSED IN THE RDH TRAY? | SCANNED DOCUMENTS SENSED IN THE RDH TRAY? | CHECK FOR DOCUMENT ON PLATEN? | DOCUMENT SENSED ON PLATEN? | SYSTEM ACTION |
|---|---|---|---|---|---|---|---|---|---|
| 1 | FIRST TASK AFTER IIT POWER UP | YES | CLOSED | NO | NO | N.A. | YES- DURING POWER UP SEQ. | NO | DECLARE FAULT "NO DOCUMENT TO SCAN" AT START. |
| 2 | FIRST TASK AFTER IIT POWER UP | YES | CLOSED | NO | NO | N.A. | YES- DURING POWER UP SEQ. | YES | SELECT PLATEN MODE. |
| 3 | FIRST TASK AFTER IIT POWER UP | YES | CLOSED | NO | YES | N.A. | YES- DURING POWER UP SEQ. | NO | SELECT RDH MODE. |
| 4 | FIRST TASK AFTER IIT POWER UP | YES | CLOSED | NO | YES | N.A. | YES- DURING POWER UP SEQ. | YES | DECLARE FAULT "REMOVE DOCUMENT LEFT ON THE GLASS". |
| 5 | FIRST TASK AFTER IIT POWER UP | YES | CLOSED | YES | NO | N.A. | YES- DURING POWER UP SEQ. | NO | SELECT SADH MODE. |

TO FIG. 12B

| | | | | | | | |
|---|---|---|---|---|---|---|---|
| 6 | FIRST TASK AFTER IIT POWER UP | YES | CLOSED | YES | NO | N.A. | YES-DURING POWER UP SEQ. | YES | DECLARE FAULT "REMOVE DOCUMENT LEFT ON THE GLASS". |
| 7 | FIRST TASK AFTER IIT POWER UP | YES | CLOSED | YES | YES | N.A. | YES-DURING POWER UP SEQ. | NO | SELECT SADH MODE. |
| 8 | FIRST TASK AFTER IIT POWER UP | YES | CLOSED | YES | YES | N.A. | YES-DURING POWER UP SEQ. | YES | DECLARE FAULT "REMOVE DOCUMENT LEFT ON THE GLASS" |

FROM FIG. 12A

| CASE # | LAST IIT TASK? | UDH REMAINED CLOSED SINCE LAST SCAN? | CURRENT UDH COVER STATE? | DOCUMENT SENSED IN THE SLOT? | UNSCANNED DOCUMENTS SENSED IN THE RDH TRAY? | SCANNED DOCUMENTS SENSED IN THE RDH TRAY? | CHECK FOR DOCUMENT ON PLATEN? | DOCUMENT SENSED ON PLATEN? | SYSTEM ACTION |
|---|---|---|---|---|---|---|---|---|---|
| 9 | PLATEN | YES | CLOSED | NO | NO | NO | NO | N.A. | SELECT PLATEN MODE. |
| 10 | PLATEN | YES | CLOSED | NO | NO | NO | NO | N.A. | SELECT PLATEN MODE. |
| 11 | PLATEN | YES | CLOSED | NO | NO | YES | NO | N.A. | DECLARE FAULT "REMOVE DOCUMENT LEFT ON THE GLASS". |
| 12 | PLATEN | YES | CLOSED | YES | NO | NO | NO | N.A. | DECLARE FAULT "REMOVE DOCUMENT LEFT ON THE GLASS". |
| 13 | PLATEN | YES | CLOSED | YES | NO | YES | NO | N.A. | DECLARE FAULT "REMOVE DOCUMENT LEFT ON THE GLASS". |
| 14 | PLATEN | YES | CLOSED | YES | YES | NO | NO | N.A. | DECLARE FAULT "REMOVE DOCUMENT LEFT ON THE GLASS". |

TO FIG. 12D

| | | | | | | | |
|---|---|---|---|---|---|---|---|
| 15 | UDH | YES | CLOSED | NO | NO | NO | N.A. | DECLARE FAULT "NO DOCUMENT TO SCAN". |
| 16 | UDH | YES | CLOSED | NO | NO | YES | N.A. | SELECT RDH MODE. |
| 17 | UDH | YES | CLOSED | NO | YES | NO | N.A. | SELECT RDH MODE. |
| 18 | UDH | YES | CLOSED | YES | NO | NO | N.A. | SELECT SADH MODE. |
| 19 | UDH | YES | CLOSED | YES | YES | NO | N.A. | SELECT SADH MODE. |
| 20 | UDH | YES | CLOSED | YES | NO | YES | N.A. | SELECT SADH MODE. |
| 21 | DON'T CARE | NO | OPEN | NO | NO | NO | N.A. | SELECT PLATEN MODE. |
| 22 | DON'T CARE | NO | OPEN | NO | NO | YES | N.A. | SELECT PLATEN MODE. |
| 23 | DON'T CARE | NO | OPEN | NO | YES | NO | N.A. | DECLARE FAULT "CLOSE UDH COVER". |

FROM FIG. 12C

| CASE # | LAST IIT TASK? | UDH REMAINED CLOSED SINCE LAST SCAN? | CURRENT UDH COVER STATE? | DOCUMENT SENSED IN THE SLOT? | UNSCANNED DOCUMENTS SENSED IN THE RDH TRAY? | SCANNED DOCUMENTS SENSED IN THE RDH TRAY? | CHECK FOR DOCUMENT ON PLATEN? | DOCUMENT SENSED ON PLATEN? | SYSTEM ACTION |
|---|---|---|---|---|---|---|---|---|---|
| 24 | DON'T CARE | NO | OPEN | YES | NO | NO | NO | N.A. | DECLARE FAULT "CLOSE UDH COVER". |
| 25 | DON'T CARE | NO | OPEN | YES | NO | YES | NO | N.A. | DECLARE FAULT "CLOSE UDH COVER". |
| 26 | DON'T CARE | NO | OPEN | YES | YES | NO | NO | N.A. | DECLARE FAULT "CLOSE UDH COVER". |
| 27 | DON'T CARE | NO | CLOSED | NO | NO | NO | YES-DURING SCAN | NO | SELECT PLATEN MODE. DECLARE FAULT "NO DOCUMENT TO SCAN" DURING SCAN. ABORT SCAN OR DELETE IMAGE AFTER SCAN COMPLETE. |
| 28 | DON'T CARE | NO | CLOSED | NO | NO | NO | YES-DURING SCAN | YES | SELECT PLATEN MODE. |

FROM FIG. 12E

| | | | | | | | |
|---|---|---|---|---|---|---|---|
| 29 | DON'T CARE | NO | CLOSED | NO | NO | YES | YES-BEFORE SCAN | SELECT RDH MODE. |
| 30 | DON'T CARE | NO | CLOSED | NO | NO | YES | YES-BEFORE SCAN | SELECT PLATEN MODE. |
| 31 | DON'T CARE | NO | CLOSED | NO | YES | NO | YES-BEFORE SCAN | SELECT RDH MODE. |
| 32 | DON'T CARE | NO | CLOSED | NO | YES | NO | YES-BEFORE SCAN | SELECT PLATEN MODE. |
| 33 | DON'T CARE | NO | CLOSED | YES | NO | NO | YES-BEFORE SCAN | SELECT SADH MODE. |

FIG. 12G

| CASE # | LAST IIT TASK? | UDH REMAINED CLOSED SINCE LAST SCAN? | CURRENT UDH COVER STATE? | DOCUMENT SENSED IN THE SLOT? | UNSCANNED DOCUMENTS SENSED IN THE RDH TRAY? | SCANNED DOCUMENTS SENSED IN THE RDH TRAY? | CHECK FOR DOCUMENT ON PLATEN? | DOCUMENT SENSED ON PLATEN? | SYSTEM ACTION |
|---|---|---|---|---|---|---|---|---|---|
| 34 | DON'T CARE | NO | CLOSED | YES | NO | NO | YES-BEFORE SCAN | YES | IF CFF HAS BEEN SELECTED AT THE UI, DECLARE FAULT "REMOVE DOCUMENT LEFT ON THE GLASS". OTHERWISE SELECT PLATEN MODE. |
| 35 | DON'T CARE | NO | CLOSED | YES | NO | YES | YES-BEFORE SCAN | NO | SELECT SADH MODE. |
| 36 | DON'T CARE | NO | CLOSED | YES | NO | YES | YES-BEFORE SCAN | YES | IF CFF HAS BEEN SELECTED AT THE UI, DECLARE FAULT "REMOVE DOCUMENT LEFT ON THE GLASS". OTHERWISE SELECT PLATEN MODE. |

TO FIG. 12H

| | | | | | | | |
|---|---|---|---|---|---|---|---|
| 37 | DON'T CARE | NO | CLOSED | YES | YES | NO | YES-BEFORE SCAN | NO | SELECT SADH MODE. |
| 38 | DON'T CARE | NO | CLOSED | YES | YES | NO | YES-BEFORE SCAN | YES | IF CFF HAS BEEN SELECTED AT THE UI, DECLARE FAULT "REMOVE DOCUMENT LEFT ON THE GLASS". OTHERWISE SELECT PLATEN MODE. |

FROM FIG. 12G

*FIG. 12H*

FAULT CLEARANCE AND RECOVERY IN AN ELECTRONIC REPROGRAPHIC SYSTEM

This is a Continuation of application Ser. No. 08/208,071 filed Mar. 9, 1994, now abandoned, which in turn is a Rule 62 Continuation of 07/589,630 filed Sep. 28, 1990, now abandoned

CROSS-REFERENCED TO RELATED APPLICATION

This application is related to U.S. patent application Ser. No. 07/589,541, now U.S. Pat. No. 5,148,286 entitled "Method And Apparatus For Operating An Electronic Reprographic System Upon Detection Of A Scan Interruption" filed Sep. 28, 1990, and U.S. patent application Ser. No. 07/590,580, entitled "Automatic Document Imaging Mode Selection System", filed Sep. 28, 1990, the disclosures of which are incorporated by reference herein.

BACKGROUND OF THE INVENTION

1. Field of the Invention

The present invention relates to a system of electronic reprographics and, more particularly, to a system of electronic reprographics in which fault clearance and recovery instructions are provided.

2. Description of the Related Art

In light lens printing systems, a lamp or flashing unit flashes light on a document and has an image created synchronously on a photoreceptor belt. The photoreceptor belt picks up toner from which a copy is made.

In electronic reprographic printing systems, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number of ways (e.g., words deleted or added, image magnified or reduced, etc.). If a plurality of documents comprise a job which is scanned, the processing or manipulation of the scanned documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned depending on the priority of the jobs and the desires of the operator for increasing productivity or through-put and decreasing printer or scanner down-time.

For a variety of reasons, operation in an electronic reprographic system can be interrupted. This can be the result of a scanner or printer fault, hardware or software faults, paper misfeed, intentional interruption, memory loss, etc. Upon such an interruption due to scanner fault, the operator, not knowing precisely what caused the fault, must either attempt to locate the origin of the fault or place an order for a service call. Both options can be extremely time consuming and can result in an unacceptable degree of down-time. When a fault occurs while the system is building a job, not only is down-time a result, but documents present in the paper path can be damaged and the integrity of the job cannot be guaranteed.

The related art has disclosed document processing systems which include fault detection and recovery capabilities.

U.S. Pat. No. 4,789,985 to Akahoshi et al discloses a document processing apparatus having fault detection capabilities. A technique of replacing an existing faulty resource at power up is shown. A self-diagnostic test is run every time power-up occurs. The diagnostic test checks which task modes are affected by a faulted resource so that other task modes can still be completed.

U.S. Pat. No. 4,839,895 to Makita discloses an early failure detection system for multiprocessor systems wherein a current status of an apparatus is monitored during idle microprocessor states to detect faults. If a failure occurs, that microprocessor is separated from the rest of the system.

U.S. Pat. No. 4,589,090 to Downing et al discloses a remote processor crash recovery wherein a number of control boards are used to control a copier's functions. A list of possible faults is checked to monitor current system status. A method of recovering from a board crash is shown. In addition, a technique to recover from a hardware crash is also shown. A display is used to make a user aware of a fault.

U.S. Pat. No. 4,583,834 to Seko et al discloses a copying apparatus having a computer controller. A display at the computer allows an operator to fix a fault as it occurs.

While the related art does include fault detection and recovery capabilities, it does not disclose fault clearance and recovery operations for an electronic reprographic system which categorize faults according to their characteristics and enable independent functions to continue.

OBJECTS AND SUMMARY OF THE INVENTION

Accordingly, one object of the present invention is to provide an electronic reprographic system which displays to the operator the clearance and recovery steps needed to be taken upon detection of a fault.

Another object of the present invention is to provide an electronic reprographic system which automatically monitors the fault status of the system.

Another object of the present invention is to provide an electronic reprographic system which classifies faults which can be handled using the same instructions into buckets to facilitate the recovery operation.

Another object of the present invention is to provide an electronic reprographic system which identifies specific areas requiring clearance upon detection of a fault.

Another object of the present invention is to provide an electronic reprographic system which can fault specific functions without impacting other independent functions.

Another object of the present invention is to provide an electronic reprographic system which displays instructions for independent system functions in separate display areas enabling the operator to focus only on specific areas of the system.

A further object of the present invention is to provide an electronic reprographic system with the capability to display its inability to perform specific operation requests.

To achieve the foregoing and other objects and advantages, and to overcome the shortcomings discussed above, an electronic reprographic system is provided which displays clearance and recovery instructions to enable the operator to clear and recover from fault conditions encountered during normal system operation. Because the system is comprised of a plurality of independent subsystems, instructions can be displayed in separate display areas for specific system functions to facilitate identification of system faults. Upon detection of a fault, uninvolved independent functions can continue without interruption. Fault prediction can be performed by the system. Different faults which require similar recovery operations are classified into buckets to simplify the degree of separate instructions to be displayed by the device.

BRIEF DESCRIPTION OF THE DRAWINGS

The invention will be described in detail with reference to the following drawings in which like reference numerals refer to like elements and wherein:

FIG. 7 is a view depicting an exemplary job programming ticket and job scorecard displayed on the User Interface (UI) touchscreen of the printing system shown in FIG. 1;

FIG. 9 illustrates a table identifying levels of information required by an operator relative to certain faults;

FIG. 10 illustrates a system fault bucket selection chart;

FIG. 11 illustrates a function fault bucket selection chart; and

FIGS. 12A–12H illustrate scanner mode selection charts.

DETAILED DESCRIPTION OF THE PREFERRED EMBODIMENTS

The System

Figure 1:
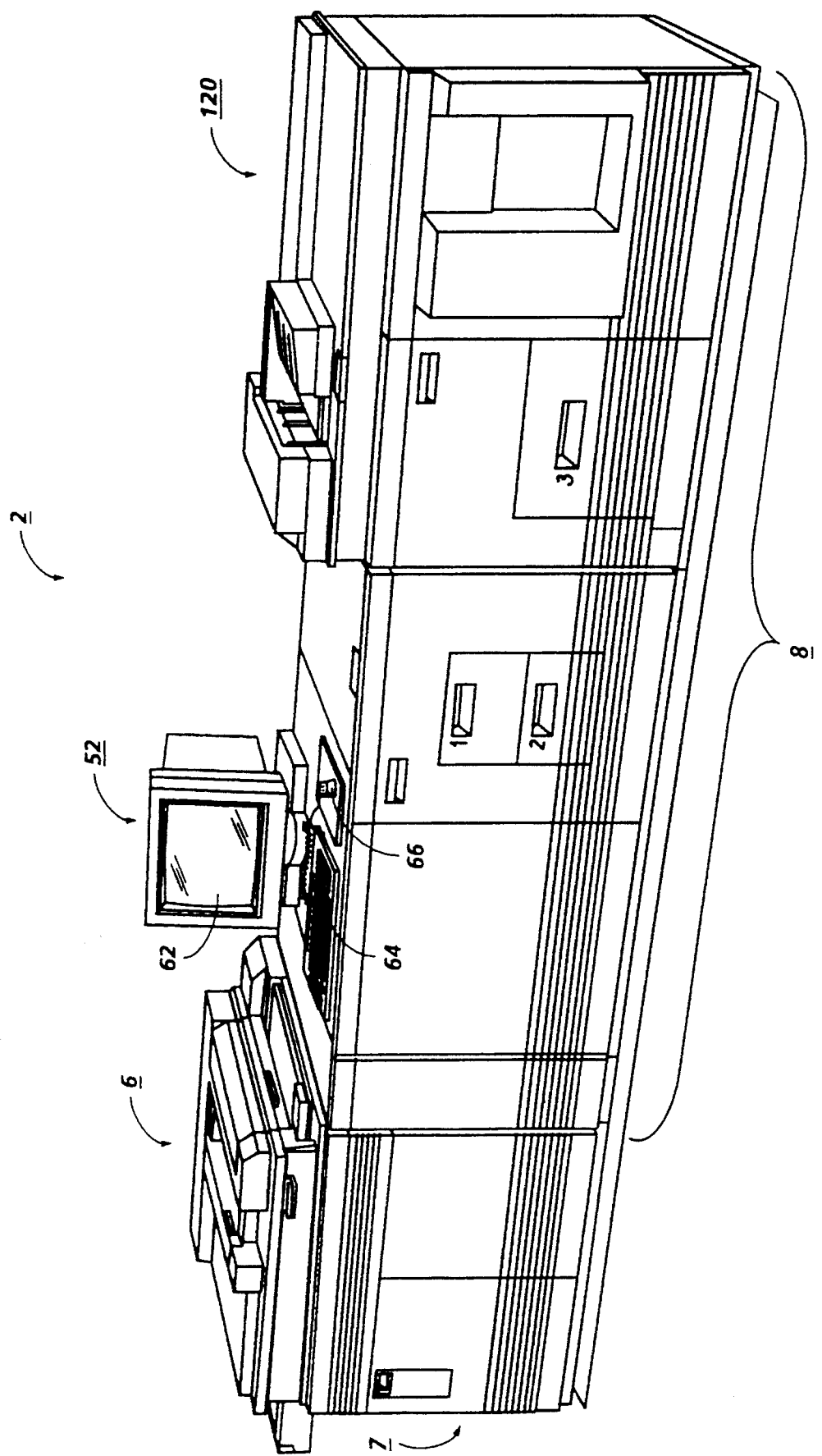
FIG. 1 is a view depicting an electronic printing system incorporating the print media identification system of the present invention.
Figure 2:
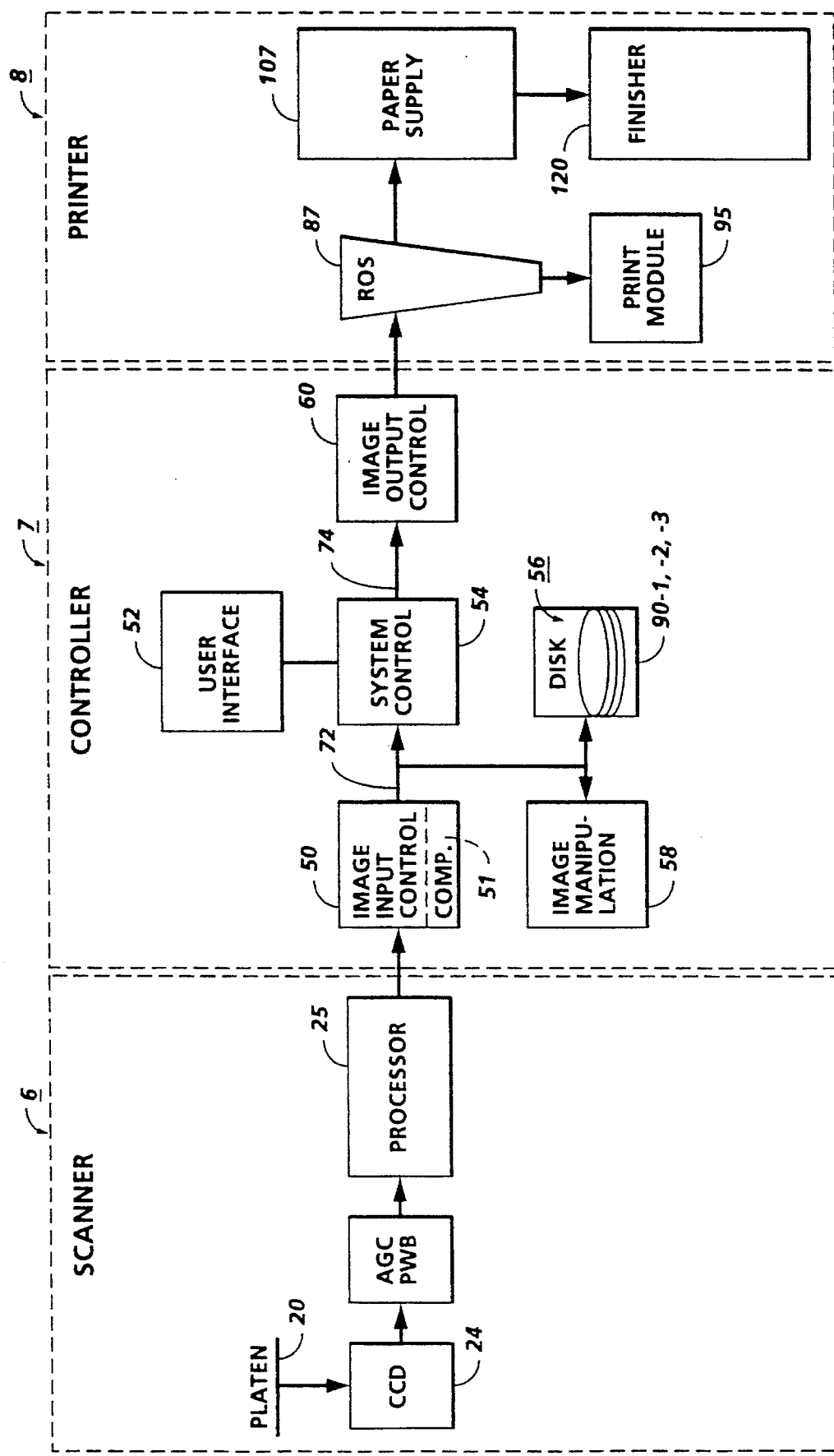
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section or image input terminal (ITT) 6, controller section 7, and printer section or image output terminal (IOT) 8. While a specific printing system is shown and described, the present invention may be used with other types of printing systems such as ink jet, ionographic, etc.

Figure 3:
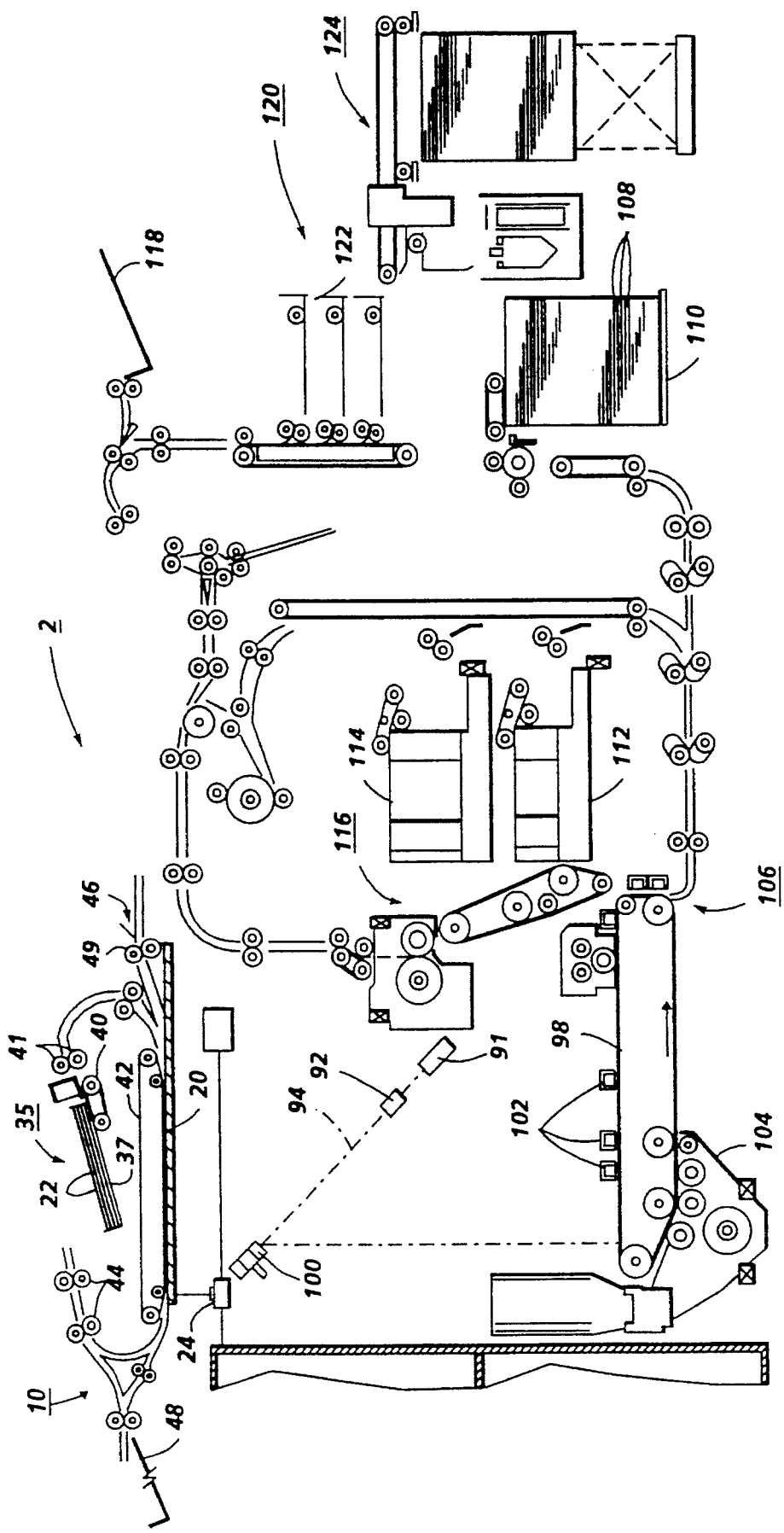
FIG. 3 is a plan view illustrating the principal mechanical components of the printing system shown in FIG. 1.
Figure 4:
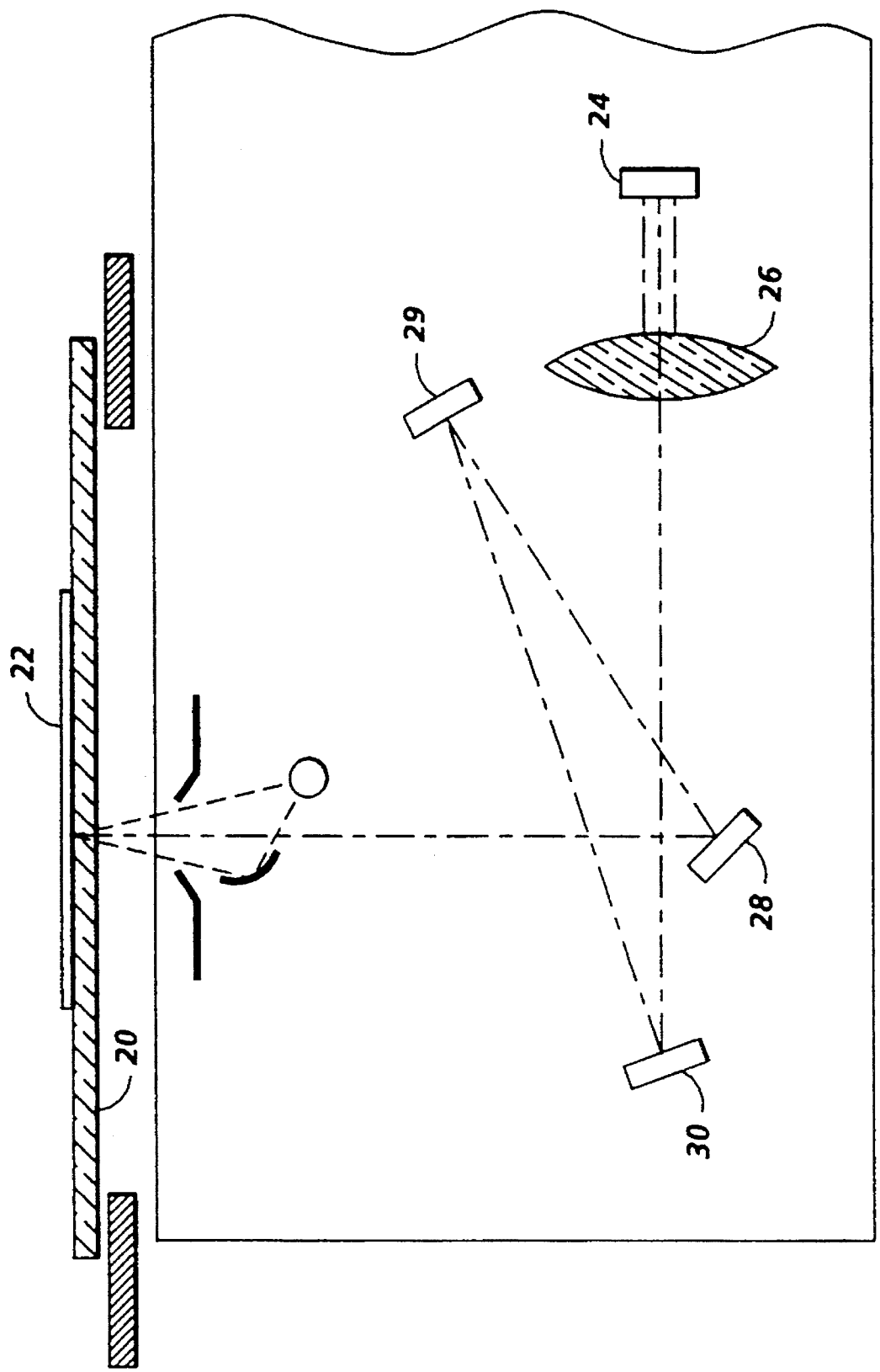
FIG. 4 is a schematic view showing certain construction details of the document scanner for the printing system shown in FIG. 1.

Referring particularly to FIGS. 2–4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning or in the automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 5A:
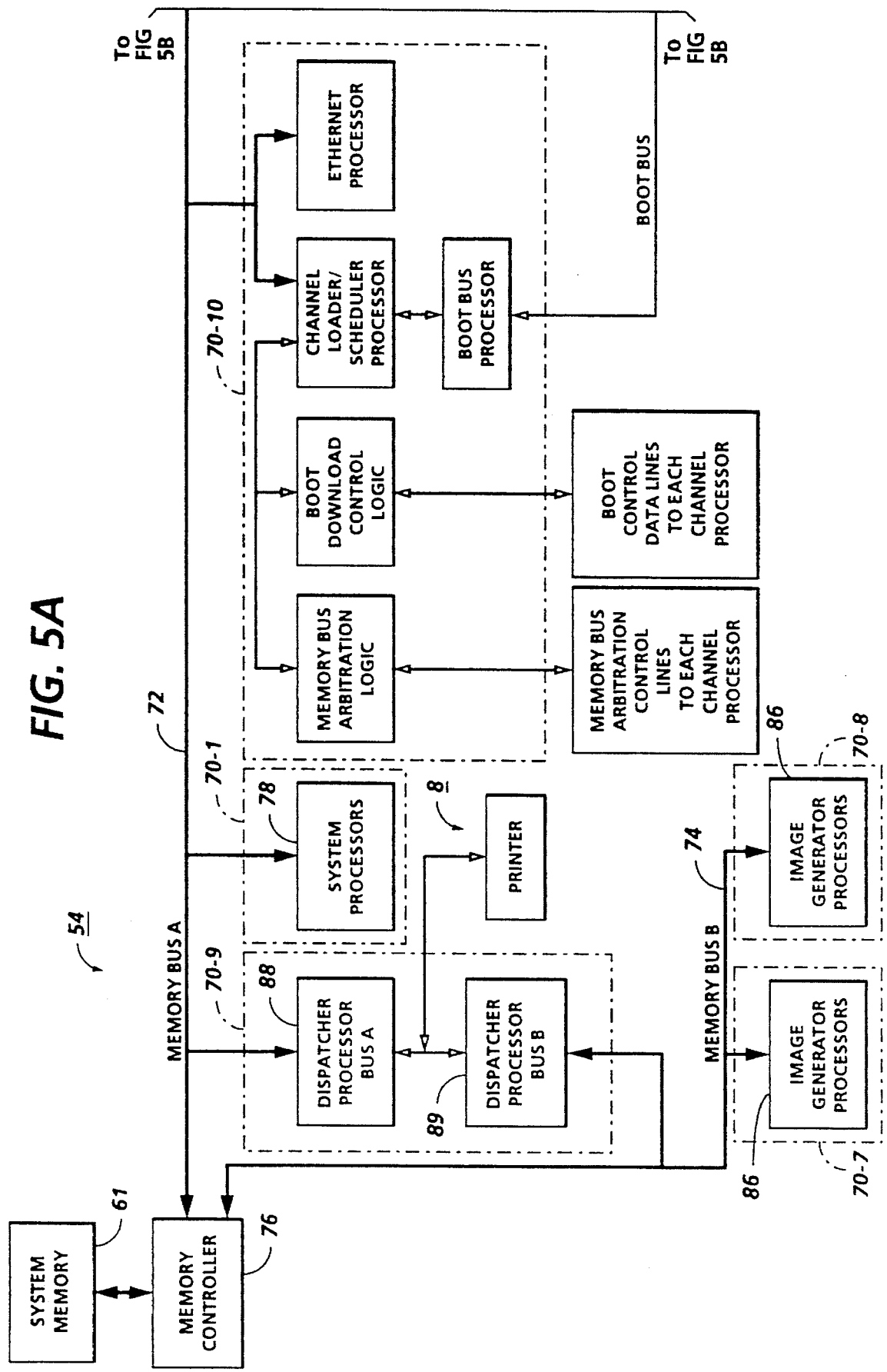
FIGS. 5A, 5B, and 5C comprise a schematic block diagram showing the major parts of the control section for the printing system shown in FIG. 1.
Figure 5B:
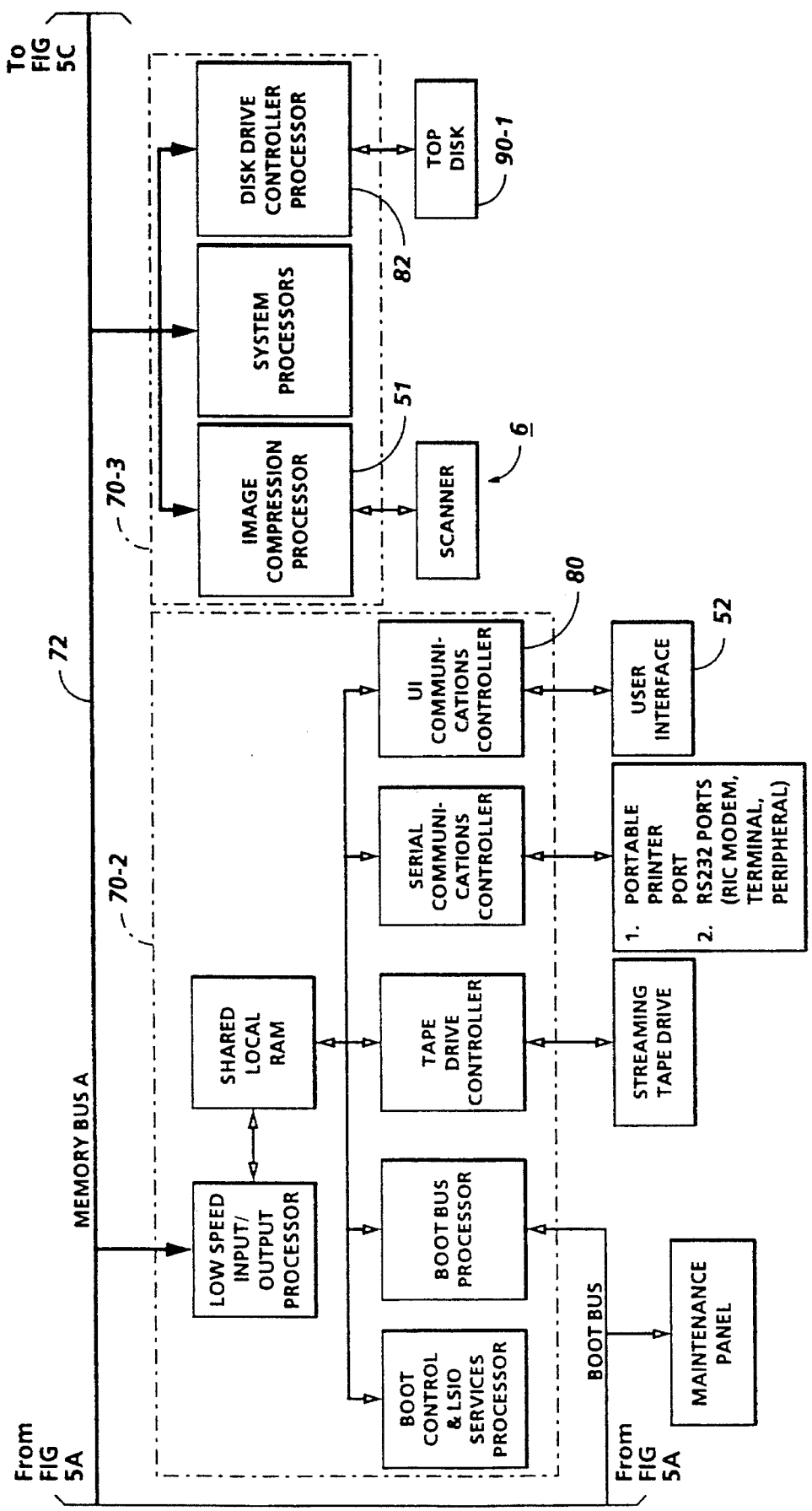
Figure 5C:
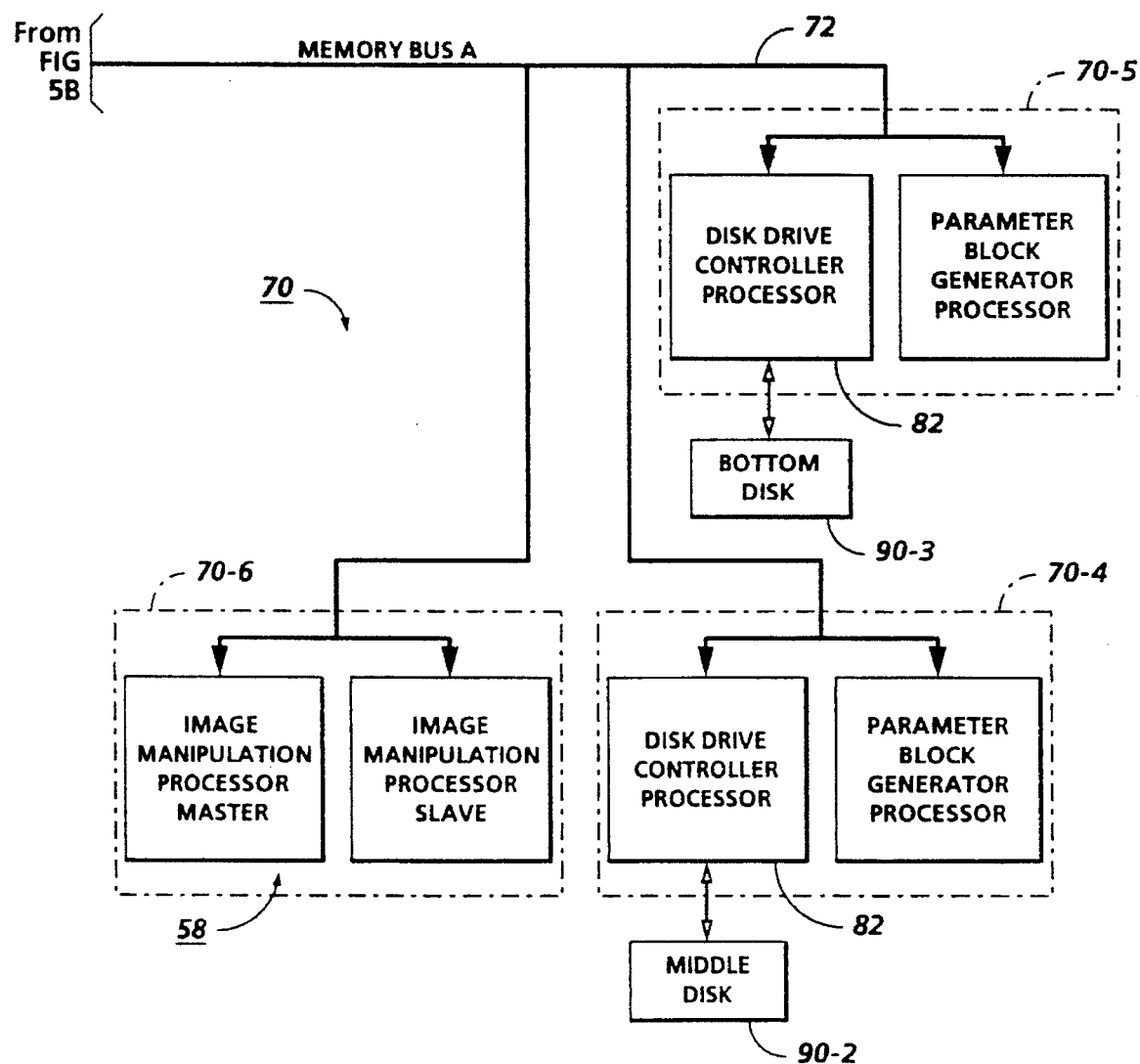

Referring particularly to FIGS. 5A–5C, control section 7 includes a plurality of Printed Wiring Boards (PWB's) 70, PWB's 70 being coupled with one another and with System Memory 61 by a pair of memory buses 72,74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point a cursor to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
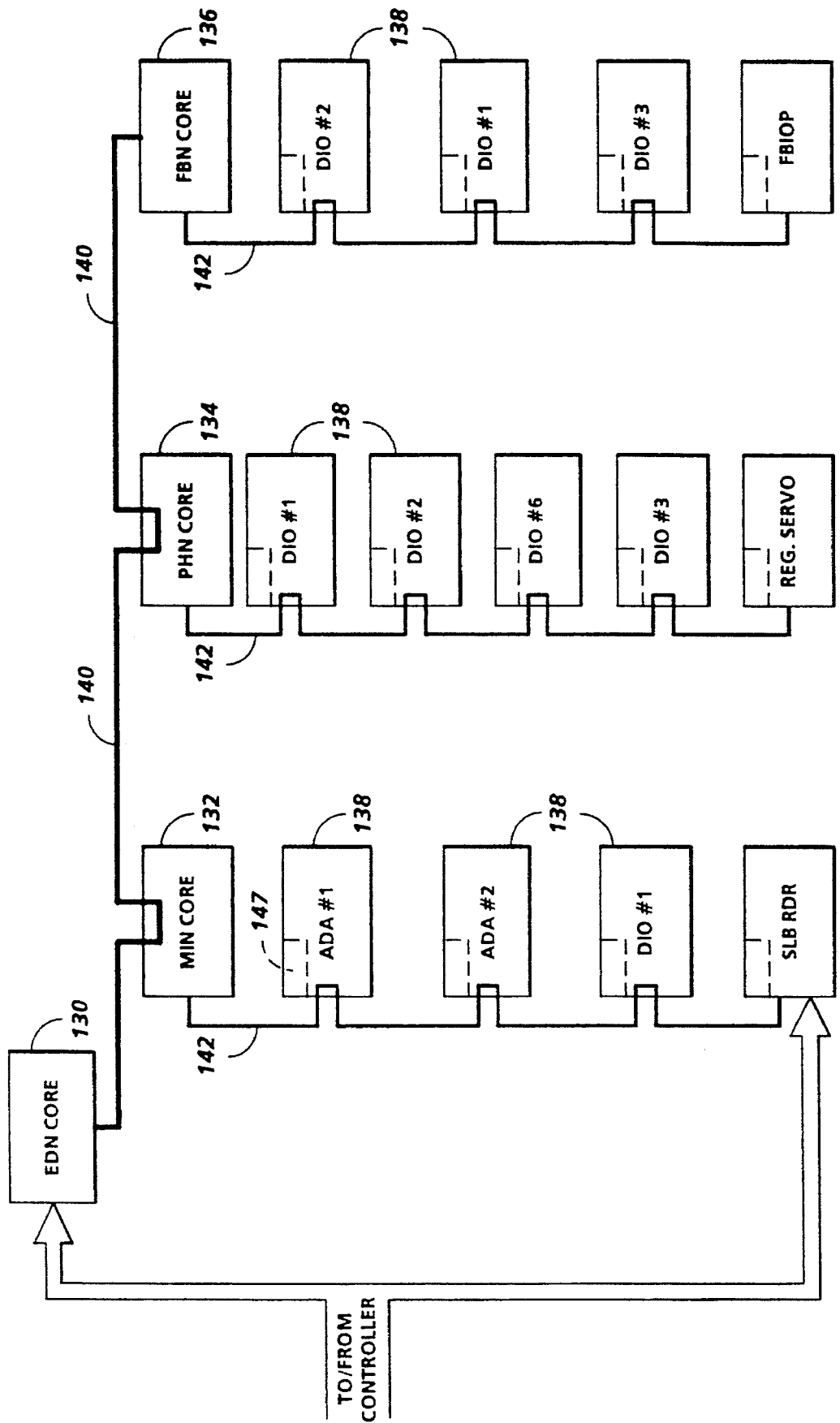
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
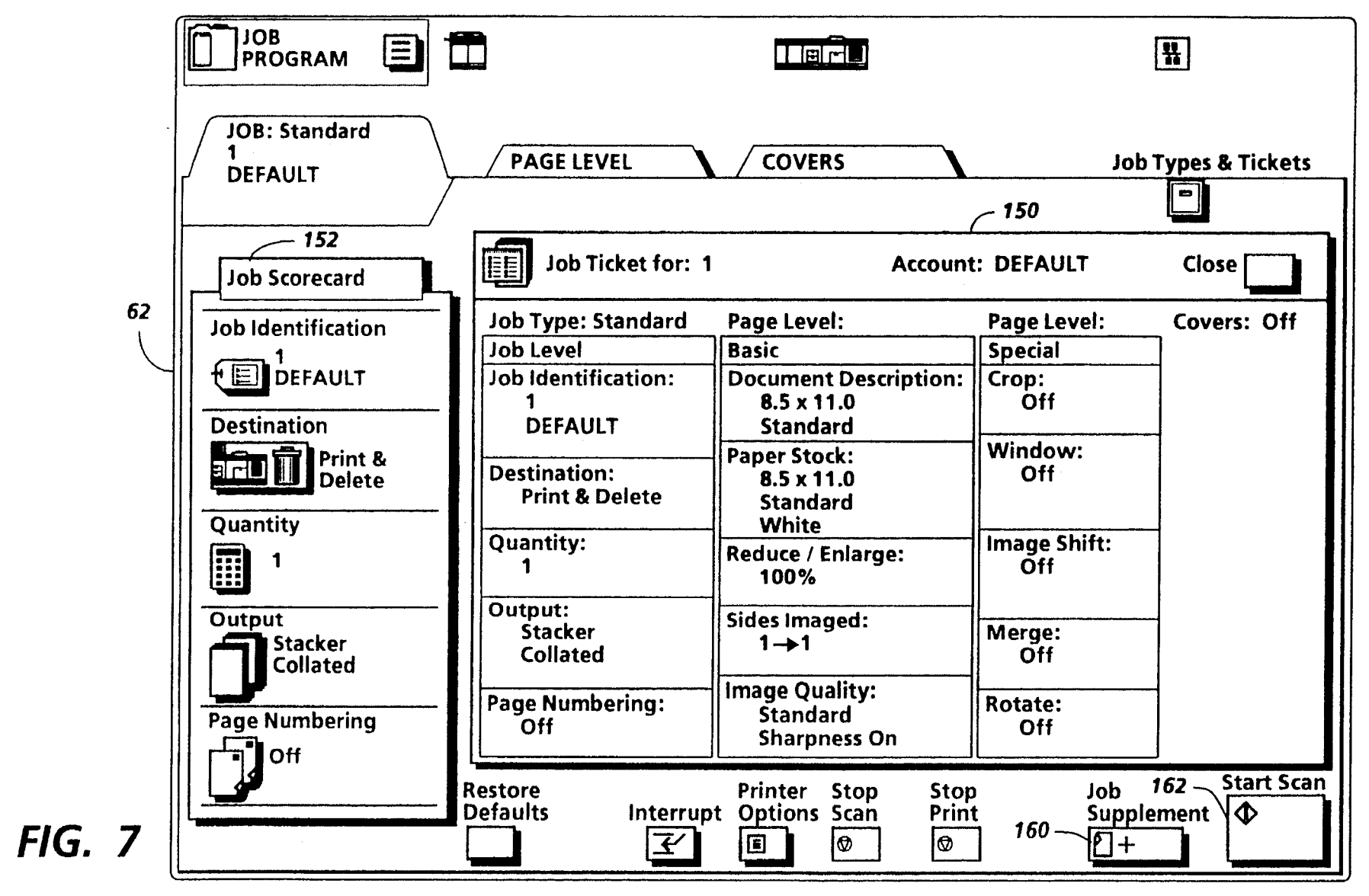

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

CRASH RECOVERY

A fault or crash is an unpredictable condition in any part of the system 2 which causes a subset of the system elements to become unavailable to the operator. Some examples are:

At the system level: Where a reboot (restart of the system after a crash which could be initiated by the system or through an operator intervention at UI 52) or a repowering (initiated by an operator only, but could include a loss of power) occurs.

At the system element level: Where the system attempts to recover automatically by reinitializing or resoftloading the system element. Additionally, during certain fault recovery procedures, the operator may cause the system to reinitialize or resoftload the system elements to achieve recovery.

At the hardware level: When the system hardware becomes inoperative.

U.S. Pat. No. 5,148,286 includes a crash recovery operation which will return the system elements to a functional state after a crash has occurred. During recovery, the initial cause of the crash (i.e., the fault) must be cleared. Whenever possible, the first attempt at recovery will be automatic, with no operator intervention, and without impact to the other system elements. If assistance is required, it will be at the operator level. If a hardware failure is detected during the system self-test, a fault code will be displayed at UI 52 to alert the operator that a service call is in order (if this fault cannot otherwise be cleared by the operator).

Categories of crashes which occur in system 2 include:
1) those that the operator can perceive, but are automatically recoverable;
2) those which cause the system to automatically recover to a certain level, but which also require the operator to assist in order to finish recovery; and
3) those in which the system cannot automatically recover, and which require the operator to initiate the process of recovery (e.g., booting, cycling power).

Scanner crash recovery is primarily controlled by the system control 54. The system control 54 stores scanner state information and scanned image information on a disk 90 in memory 56 as it is received. Upon reboot from a crash, this information can be read from the disk 90 and the state of the scanner system 6 reconstructed. In system 2, the scanner 6 is a separate sub-system, thus it is possible for the system control 54 to crash and the scanner 6 to remain in a running state. To handle these types of crashes, the scanner 6 periodically checks the communications between itself and the system control 54. If the scanner 6 determines that the system control 54 is not responding, it will shut down and wait for instructions from the system control 54. When the system control 54 performs its crash recovery, it indicates to the scanner 6 that a crash has occurred and loads the job state information into the scanner 6. This also causes the scanner 6 to issue faults that are used to clear the paper path.

In order to get the UI 52 back into a valid state after a crash, a special recovery method is implemented. Every time the system control 54 is booted, the UI 52 asks the system control 54 for the current scan job in progress and its state (current document feed mode). If there is a job in progress, the UI 52 loads the job and proceeds with its programming.

Each scanner input mode has its own unique recovery procedures. The recovery for each scan mode proceeds as follows:

Platen—Display the last image captured to the operator so that the next document required for scanning can be captured. The operator has the capability to clear the fault via a button on UI 52 in the fault frame, if all the documents required have been captured.

SADH and CFF—Display the last image captured to the operator so that the next document required for scanning can be captured via the required source. The operator has the capability to clear the fault via a button on UI 52 in the fault frame, if all the documents required have been captured. The normal misfeed instructions are presented to the operator by UI 52 to enable paper path clearance.

RDH—The operator is given the normal "reorder recovery" (clear all areas) instructions displayed at UI 52 and is instructed to reorder the originals and place them back into the handler. When scanning of the stack is resumed by the operator, the system will automatically slew feed the documents to the image required in the stack and continue scanning from that point. The system determines what the next document to capture is by searching the stack contents that were saved on the disk 90. This same stack content information is downloaded to the scanner 6 so that its document stack knowledge is the same as the system control 54, this information being used by the scanner 6 to detect document miscounts and so that the documents can be inverted correctly when required.

Figure 8:
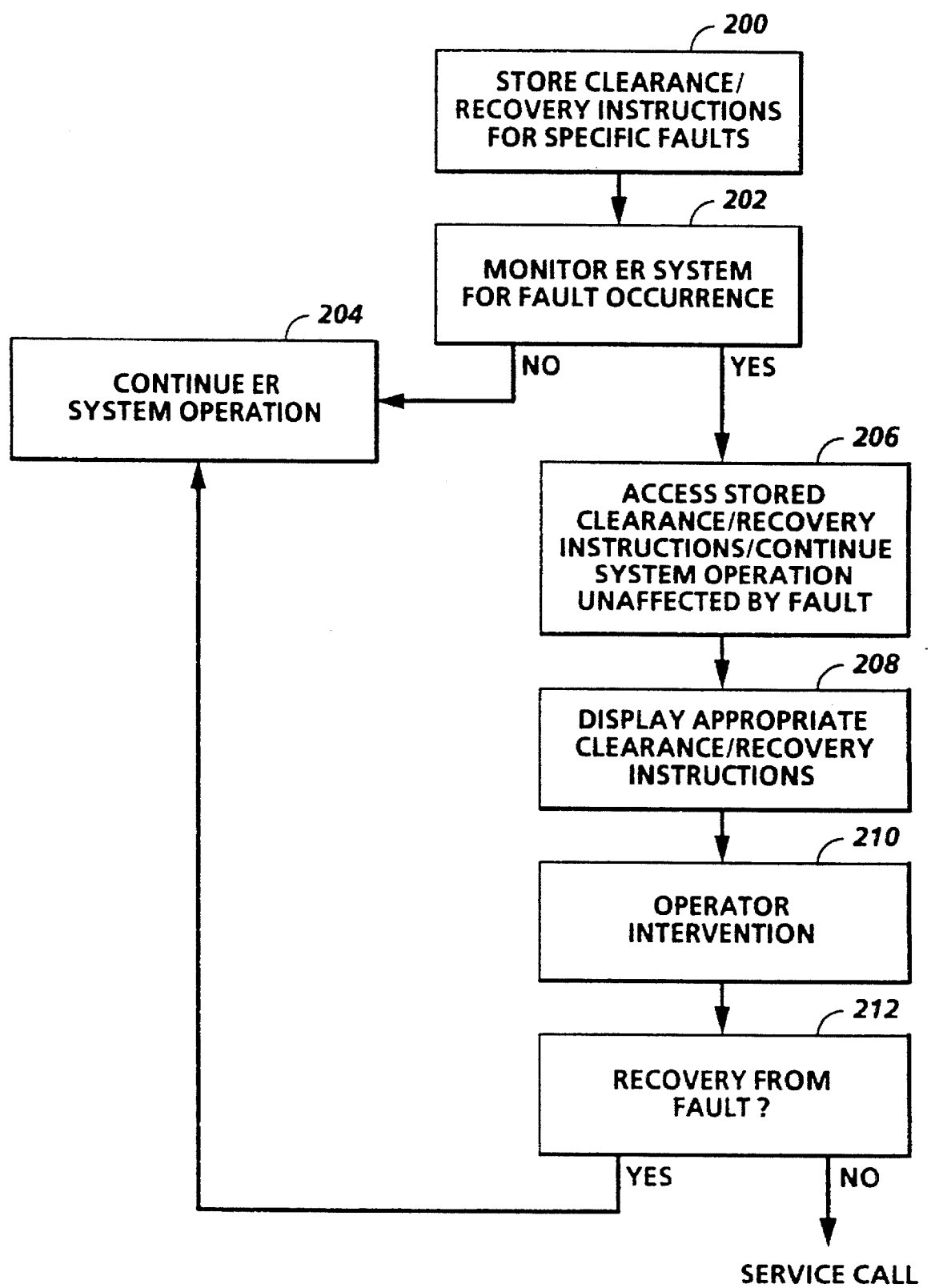
FIG. 8 is a flowchart depicting recovery operation of the FIG. 1 system according to the present invention.

Referring now to FIG. 8, the present invention includes an operation setting forth specific instructions to an operator for effecting the required operator intervention necessary to perform fault clearance and recovery.

Clearance and recovery instructions for specific faults are stored (Step 200) in system memory 61. While system 2 is operating, the system is monitored for the occurrence of any of a plurality of faults (Step 202). If no fault occurrence is detected, the normal operation of system 2 continues (Step 204). However, if a fault occurrence is detected which has corresponding clearance and recovery instructions stored in memory, these stored instructions are accessed (Step 206). The system functions which are unaffected by the specific fault detected continue without interruption. The appropriate clearance and recovery instructions which are accessed are then displayed at user interface 52 (Step 208). The operator follows the displayed instructions to perform the required operator intervention necessary to recover from the specific fault occurrence. Once fault recovery is achieved (Step 212), the normal operation of system 2 is continued (Step 204). If recovery cannot, however, be effected, a service call may be required.

The specific display and fault handling features of the present invention are set forth below. These features reference several terms which will now be defined.

A bucket is a collection of several events which trigger the same system level response and require the same operator response and message displays at user interface 52. A bucket is made up of several senses and allows similar faults to be handled with the same fault handling instructions. A sense state mechanism uses sense values to smoothly step an operator through clearance and recovery of scanner faults using a continuous series of instructions. Certain scanner faults, such as RDH misfeeds, require a specific clearance order and therefore have specific sense values.

Zone values are also provided with RDH misfeeds to report specific scanner areas which require clearance. A zone value provides a high level message describing the scanner areas requiring clearance. While a bucket specifies only one area for clearance at a time, a zone value specifies a plurality of areas for clearance.

A function defines system hardware and/or software modules which are used by system 2 to execute specific operation requests. Examples of these are image conversion, mark, post parse, scan and signatures.

A function feature is a portion of a function which can be optionally selected for use by an operator through user interface 52. The function is still usable to process a subset of its available operations when a feature is not available.

An object is an operator selectable item which exists within the system. Objects can be operated on synchronously through direct operator invocations at the user interface 52. They can also be operated on asynchronously through system invocation (by being submitted to a function as part of a queued sequence of operations).

An operation is a request for system action which is perceivable by the operator. An operation can be synchronous or asynchronous. A synchronous operation is a request for action invoked directly by the operator through the user interface 52. The operator expects feedback concerning the result of this action request before continuing on to make new action requests. An asynchronous operation is a request for action invoked directly by the operator or indirectly by the system 2. The operator does not expect immediate feedback concerning the result of the action request. The operator expects to be able to begin (or continue) making new action requests.

Operator selection is an invocation made by the operator to set up a future operation request. No immediate system action is expected by the operator as a result of the selection.

Risk classifies a clearance and/or recovery action according to its effect on the system and/or operator by taking a given course of action. Clearance and/or recovery action will be considered risky if: (1) the action could result in a hardware component being damaged or destroyed; (2) the action could result in damage or destruction of system software which cannot be readily recreated without service intervention; (3) the action could pose a physical safety hazard to the operator; and/or (4) the action could result in the loss of an operator data base which cannot be readily recreated.

A service fault code is a reference code assigned to all displayable failure events and to operator exception messages (i.e., not logged fault events).

A task is a group of operation requests organized by the system in such a way as to produce a higher level output for the operator (i.e., scan a job, print a job, etc.).

Display can be provided according to event types. A function fault event type is one which causes a specific system hardware or software module to become unavailable or degraded. A function fault, from the operator's perspective, prevents specific operation requests from being attempted or causes specific operations being executed to abort, suspend or fail. Operation requests which do not require the use of the faulted hardware or software module (or the specific faulted feature within the module) will continue to execute normally. If a function fault is such that only certain features of that hardware or software module are faulted, the function will be available in a degraded state. The function, in this case, will still be available to execute operations which do not require the faulted features.

The informational display event is one which causes an informational message to be displayed to the operator at user interface 52. Informational events have no immediate impact to ongoing system operations and do not require any mandatory operator action. Informational events can queue the operator to take an optional action which might prevent a future system, function or object fault. Some early warnings of pending function or object problems include (1) an object waiting to enter a function cannot be processed by the function because an operator supplied consumable required by the function is not available (e.g. first job in the print queue requires a paper stock that is not currently loaded and a tray is available which is not being used for the currently printing job); and (2) a source for an operator supplied consumable is exhausted while a function is executing an operation and the function has switched to an alternate supply (e.g. auto tray switching has been invoked). The pending object or function fault can be avoided if the operator executes the desired action in a timely fashion in response to a warning at user interface 52.

An object fault is an event which prevents operation requests from being attempted on a particular object or an event which causes operations currently being executed on a particular object to abort, suspend or fail. Operations which are not related to the faulted object are allowed to continue to execute normally without clearing the fault. Object faults occur for the following reasons: (1) an object in the print queue is prevented from entering a function required for print because a feature of the function required by the object is not currently available; (2) something about the object itself prevents a function from continuing an operation already in progress; (3) a function operating on an object faults with the object in a partially processed state and the function is one that handles its faults by removing the object from the function; (4) object faults because of invalid programming parameters which are not detected until after the object entered the system; (5) an object located external to the base system (i.e., from a net source) is required to continue processing an object currently resident in the system and the external object either cannot be found or is faulted; and (6) the system does not have enough resources to process the object as requested. The invalid parameters prevent the object from being processed by a function it is attempting to enter.

An operation delay is an event which occurs when (1) a synchronous operation takes longer than 2–4 seconds to execute; and (2) an asynchronous operation which the operator can perceive is interrupted for longer than 8–10 seconds.

An operation failure is an event which causes a system action request to stop executing. Operation failures will cause the affected operation to suspend or abort. The operator will only be aware of an operation failure when a synchronous operation has failed.

A selection conflict is an event which occurs when the operator selects a combination of features which are in conflict with each other.

A system fault is an event which causes the entire system to become unavailable. System faults cause all current system operations to suspend or abort. The system is not available to perform any operations until the fault is cleared. If the fault cannot be cleared, further system operation is prevented and a service call is required.

The display features at user interface 52 according to the present invention are set forth as follows:

I. Functions Of Display at UI 52

A. Fault Code Display

A fault code indicates the root cause of the problem, and is used during failure isolation.

In many cases, two or more failure conditions may result in the same operator fault message and clearance procedure but will have different fault codes assigned.

Should two or more failure conditions occur in conjunction that generate the same operator fault message, the controller 7 is capable of queuing the fault codes and displaying the code for the primary failure. The controller 7 displays the fault code for the root cause or primary failure that generated the operator fault message. If the primary failure is uncertain, the code for the failure detected first shall be displayed. The controller 7 shall also update the fault code displayed in a fault clearance frame in cases where the fault status changes (i.e. one of the failures is cleared) but all the conditions necessary to clear the operator fault message have not been met.

The operator is also able to display a queue of several active failure codes. The queued faults include all active failures including masked or degraded mode failures that are not currently displayed due to the related feature not being currently selected or due to the feature/function being deconfigured from the system by the user. The queued fault displayer is dynamically updated when a failure is cleared. The priority of the queued faults is all controller 7 failures first, followed by all printer 8 failures and then all scanner 6 failures. The failures within each module (controller 7, printer 1, and scanner 6) are displayed in the priority presented to the operator.

The assignment of fault codes adheres to the Multinational Standard for Diagnostic Program Numbers and Status Codes (700P02860). The format of the code will be a three digit alphanumeric prefix, a dash, and a 3 digit suffix (AXX-YYY). The code assignment is made with the prefix representing the section of the service documentation/dialog that contains the faulted function. The assignment of specific suffix numbers is based on the sequence of operation within the function or other factors that systematize the process.

When normal UI 52 display capability does not exist, a four digit code is displayed at a Maintenance panel.

B. Function Fault Display

Three separate display areas of UI 52 for handling Function faults are provided as follows:

Function Faults which impact the ability to scan jobs into the system;

Function Faults which impact the ability to print jobs into the system;

Function Faults which impact the ability to do operations other than Scan or Print (i.e. Image Display operations, External Data interface communications, etc.)

The display provides the following to the operator relative to function faults:

A mechanism to allow the operator to display the detailed fault clearance and recovery procedures;

For cases where an automatic fault clearance and/or recovery attempt fails, a mechanism which allows the operator to retry the required recovery procedures (i.e. a fault reset mechanism);

For cases where the operator is the decision maker on when clearance and recovery should be attempted, a mechanism which allows the operator to retry or initiate the required recovery procedures (i.e. a fault reset mechanism);

Function fault occurrences do not spontaneously cause the current UI 52 work space area to be covered with fault clearance information. The top level Function fault display should be confined to a particular display area; and If the fault cannot be cleared, a means is provided to inform the operator of what things cannot be done by the system as a result of the fault.

C. Information Message Display

The operator view of informational messages related to asynchronous operations will always be through the appropriate area of status handler of UI 52. Early warnings of pending Function or Object faults will always be related to asynchronous operations. The operator view of informational messages related to synchronous operations will always be through a current dialog message display area of UI 52.

D. Object Fault Display

From the Operator's perspective, objects will only exist in the following locations:

In the scanner 6;
In the Print Queue;
In the Printer 8;
In the System File; and
In a directory.

The top level operator view of faulted objects is as follows: If the object has faulted while it is in the Scanner 6 or Printer 8, the operator is made aware of the faulted object via a function fault displayed in the status handler area of UI 52. If the object faults while it is in the print queue, the operator is made aware of the faulted object via a "Faulted job in the print queue" message displayed in the printer display area of the status handler UI 52. If the object faults while it is in the System File, the operator will be made aware of the faulted object via a "Faulted job in the System File" message displayed in the "System Status" display area of the status handler of UI 52. If the Object faults during a Synchronous Operation attempt (e.g. an Image Display operation or a Directory manipulation), the operator is made aware of the faulted object via an operator failure message in the current dialog message display area of UI 52.

In all cases, specific information on how to correct the faulted object will be available with the object at the point in the dialog area of UI 52 where the object can be viewed. The level of information available is specific enough to handle the cases identified in FIG. 9. Faulted objects should always be distinguishable from unfaulted objects in the dialog area of UI 52 at the point where they can be viewed by the operator.

E. Operation Delay Display

Synchronous operation delay messages are displayed via a message in the current dialog message display area of UI 52. Asynchronous Operation delay messages are displayed in appropriate status handler display area of UI 52.

Feedback is provided to the operator when any of the following Operation Delays occur:

1. Document Handling/Scanning Function Delays which require feedback:

Scanner is warming up.

Documents are being reordered.

Automatic Document Handler/Scanner Fault Recovery attempt is in process which will take longer than 2–4 seconds.

Document handler is searching for the next separator in a stack.

Document Handler/Scanner function is cycling down in response to an Interrupt invocation.

An on line scan function diagnostic is in process which will take longer than 2–4 seconds.

2. Printer Function Delays which require feedback:

Printer is warming up.

Printing process is interrupted to do an Image Quality Adjustment.

Automatic Printer Fault Recovery attempt is in process which will take longer than 2–4 seconds.

Printer is Cycling down from a Stop Print invocation.

Bind job is submitted to Print Queue, Print Queue is empty, and the Binder is not warmed up.

An on line print function diagnostic is in process which will take longer than 8–10 seconds.

Fuser goes under temperature during print.

Printing Process is interrupted to do an Unload Stacker operation.

Printing operation is interrupted between queued jobs (<8–10 seconds between jobs required).

Printing process is delayed to deliver purged sheets to the top tray.

3. External Data Interface Operation Delays which require feedback:

Requirements are to be determined depending on whether these operations are implemented as synchronous or asynchronous operations.

4. Print Queue Delays which require feedback:

Job has been submitted to Print Queue, but the printer must remain in a standby ready state (i.e., printer startup must be delayed) because the only available job(s) in the print queue must be operated on before being submitted to print (e.g. batch rotated, signaturized, formatted, etc.).

5. UI 52 Delays which require feedback:

While touch function is unavailable because it is being reset.

When mode switching is delayed.

Edit Mode delays which will take longer than 2–4 seconds.

An on line image display diagnostic is in process which will take longer than 2–4 seconds.

F. Operation Failure Display

The operator is informed of Synchronous operation failure via a message displayed in the current dialog message area of UI 52. The failure message generally informs the operator of the reason for the operation failure.

If the operation failure has been caused by a function fault, the message indicates what particular function/function feature is not currently available.

If the operation failure is the result of an object fault, the message indicates where the faulted object can be found.

The operator view of Asynchronous operation failures will always be through Function faults or Object faults displayed in the status handler message area.

G. Selection Conflict Display

If the conflict is detected at the time of programming, the operator view of selection conflicts is through a message displayed in the current dialog message area of UI 52. If the conflict is detected after an object has been created and entered the system, the conflict is displayed through the normal Object fault display mechanisms.

H. System Fault Display

System faults are the highest priority events from a display perspective. When this type of fault occurs, the dialog area of UI 52 provides the operator with a very obvious indication that the system is "broken". There are no requirements to display other types of events to the operator while a system fault exists. System faults can also cause secondary Function and/or Object faults to occur. However, display of these events is of a secondary importance until after the system fault is cleared. The only requirement is that these secondary events be displayed to the operator through their normal display mechanisms after the system fault has been successfully cleared.

If a full UI 52 display capability exists after a system fault has been declared, the status handler provide access to the following:

A display of the detailed fault clearance and recovery procedures;

For cases where an automatic fault clearance and/or recovery attempt fails, a mechanism which allows the operator to retry the required procedures (i.e. provide a fault reset mechanism); and For cases where the operator is the decision maker on when clearance and recovery should be attempted, a mechanism which allows the operator to initiate the required procedures (i.e. provide a fault reset mechanism).

If a full display capability does not exist, the display is as follows:

If Reduced Display Mode (RDM) capability exists, a fault indication should be displayed at the UI 52 and the appropriate service code should be displayed at the maintenance panel;

If RDM capability does not exist, only the service code will be displayed at the maintenance panel.

II. System Event Handling

The unique System level requirements for handling events are largely dictated by the event type, the uniqueness of the required system response to the event, and the uniqueness of the operator displays required to deal with the event. From the operator's perspective, all events which have common attributes in these areas are grouped into the same event bucket even though they may have widely diverse causes.

A. General Handling of System Faults

The general requirements for handling System Faults are dependent on the following:

Whether or not continued operation in the current state would pose a risk to the operator or system;

The state of the system after the fault is declared (in the middle of booting or during normal operation);

The display capability that exists after the fault is declared (Full Display, Reduced Display Mode, or Maintenance Panel Only);

Whether or not attempting fault clearance and/or recovery would pose a risk to the operator or system; and Whether or not Operator assistance is required to attempt the clearance or recovery procedure.

FIG. 10 provides a guideline for selecting the appropriate System Fault bucket based on the above factors.

1. Other Miscellaneous System Fault Handling Features

In cases where the controller 7 determines that an automatic reboot of the system is necessary while the IIT and/or IOT are in a cycled up state, the ESS (if possible) should attempt to command the IIT and the IOT to complete a soft cycle down process (and wait for it to occur) before initiating the reboot process.

B. General Handling of Function Faults

The general handling of Function Faults is dependent on the following:

Whether or not the function is totally unavailable after the fault is declared or whether only certain features of the function are not available;

Whether or not attempting fault clearance and/or recovery would pose a risk to the operator or system;

Whether or not attempting fault clearance and/or recovery would cause other functions to suspend operation for more than an 8–10 second time period; and Whether or not Operator assistance is required to attempt the clearance or recovery procedure.

FIG. 11 provides a guideline for selecting the appropriate Function fault bucket based on the above factors.

The amount of Operator interaction required for the Scan and Print Functions is much greater than for the other functions of the system because of their physical nature. Most of the events require unique interactions. As such, there is a multitude of events related to each function which require unique event buckets.

1. Other Miscellaneous Function Fault Handling Features

If communications between controller 7 and a peripheral (scanner 6 or printer 8) are lost at any time, the peripheral which cannot communicate with the controller 7 is responsible for initiating its own soft cycle down process. If an object is automatically removed from a function as a result a function fault while it is in a partially processed state, the object is faulted before it is moved. If the operator attempts to save a partially processed object while it is in the Scan function, the object is faulted before it is moved to the system file. Anytime a hardware function halts operation with an object still in it, the operator should have access to "Save Object" and "Delete Object" mechanisms.

If multiple faults occur simultaneously within a given hardware module (e.g. Print or Scan), the function recovery instructions are not displayed until all faults which make the module Not Ready have been cleared. When all faults have been cleared, only one set of function recovery instructions are provided to the operator representing the composite recovery required. If a peripheral is stopped by the controller 7 to attempt a reboot, the peripheral recovers per the Crash Recovery strategy. That is:

If the operator is not required to open any covers or doors of the peripheral to clear secondary faults which have occurred as a result of the reboot attempt, operation of the peripheral is resumed automatically.

If the operator is required to open any covers or doors, operation of the peripheral in question is resumed only as a result of a direct operator invocation through UI 52.

C. General Handling of Object Faults

If the Object is in either the Scan or Print function at the time of the fault, the Function suspends Operation and the Object remains in the Function.

The operator always has the option to remove the object from these functions (Delete or Save) once the fault is declared.

If the operator removes a faulted object from either of these functions and the function was faulted solely because the object was faulted, the act of removing the faulted object from the function causes the function fault to clear and the function to return to a ready state.

If the Object is in any other function (other than scan or print) at the time of the fault, the system automatically removes the Object from the function when the fault occurs. In this case, the function is not faulted and the object is accessible in the UI 52 at the last location it was in prior to entering the function.

2. Handling object faults which occur while the object is in more than one function If an object fault occurs while it is being operated on by more than one function, the following general rules apply:

The Object is faulted.

All functions upstream (i.e. if the Object is in Scan, Post Parse and Print, Scan is upstream of Post Parse and print is downstream of Post Parse) of where the fault occurs continue operating on the object until an operator action is taken that prevents continuing.

All functions downstream of where the fault occurs suspend or abort operation.

If the object is in the print function (i.e. prints already being made) when the fault occurs and it did not fault in the Scan function, the Print function faults and the Delete or Save Options are made available in a Printer Status Handler Display area of UI 52.

If the Object faulted in the Scan function, the Scan function faults and the options to delete or save the object are available through a Scanner Status Handler display area of UI 52.

In all other cases, the object is available for selection somewhere within the UI 52 and the operator options reside with the object.

3. Clearing faulted objects

All object faults can be cleared by the operator indicating via an interface invocation that the problem has been corrected. In addition, objects in the Print Queue which become faulted while attempting to enter a Print function (e.g. Format, Mark, Auto Signatures) because a function feature required to process the object is not currently available become unfaulted if the operator moves the object to the system file.

4. Options for dealing with Faulted Objects

The operator minimally has the following options available for dealing with faulted objects:

| Faulted Object Type | Available Faulted Object Operations |
| --- | --- |
| Saved Program Job | Deleted Program Review Job Reprogram Job Edit Job |
| Library Item | - Delete Pages<br>- Reprogram Pages<br>- Edit page level content<br>Delete Job<br>Delete Item<br>Edit Item |

III. General Status Handler Display

The status handler display provides three unique message display areas for communicating system events to the operator. The display of the various events is partitioned as follows:

A. Scanner Display

1) Scanner State Information (Ready, Not Ready, Scanning Job XX).

2) Function Faults which stop the scanner and/or make the Scanner Not Available to Scan any Job.

3) Scanner Status and Warning Messages.

4) Function Faults which make the Scanner Not Available to accept some Scan jobs or make the Scanner function Degraded (Degraded Scanner Capability).

Examples:

Image Quality is Degraded.

Document Handler is not Available (Only Platen mode available).

RDH and SADH not available (Only Platen and CFF mode available).

RDH not available.

Slot not available (no SADH or CFF).

Separator function and Platen mode not available.

CFF not available.

SALDH mode (large documents) not available.

Auto size sensing not available.

Start Scan control at the Scanner not available.

Stop control at the Scanner not available.

B. Printer Display

1) Printer State Information (Ready, Not Ready, Printing Job XX)

2) Function Faults which stop the Printer and/or make the Printer Not Available to Print any Job.

3) Faulted Jobs in the Print Queue warning messages.

4) Printer Status and Warning Messages

Examples:

X sets complete, Y sets selected.

Next Job requires a new stock and a tray is available.

Tray goes empty and auto tray switching has occurred.

5) Function Faults which make the Printer Not Available to accept some Print jobs or make the Print function degraded (Degraded Printer Capability)

Examples:

Finisher not available.

Stitching function not available.

Binding function not available.

Signature printing not available.

Tray 1 not available.

Tray 2 not available.

Tray 3 not available.

C. System Control Display

1) System Status Messages

Examples:

Low Disk space warnings.

Disk needs to be scavenged.

2) Faulted Job in System file warning messages.

3) Function faults which impact things other than Print and/or Scan.

Image Display functions not available.

External Data Interface not available.

Examples:

Copy to From Streaming Tape not available.

External Data Interface not available.

XNS Data Interface not available.

UI Function Degraded

Examples:

Mouse Unavailable.

Touch Unavailable.

Keyboard Unavailable.

System faults which prevent all system functions from operating will either be displayed through a separate display mechanism which takes display priority over all of the above status display mechanism which takes display priority over all of the above status displays or will be displayed in all Status Handler message display areas simultaneously.

The status handler display area is able to simultaneously display messages for each of the major display areas identified in sections III A–C and also is capable of simultaneously displaying multiple top level messages within each of these areas.

If a lower level function fault occurs which impacts independent system level functions as perceived by the operator (e.g. Post Parse function fault can impact the Printing function and the Image Display function and these are both independent functions from the operator's point of view) then the fault is displayed in all applicable Status Handler display areas per the requirements stated in sections III A–C.

D. Status Handler Display Priorities

In the event that there are more messages than there is room for display in a given Status Handler Display area, the display priority will be in the order listed in sections III A–C. If there are multiple messages of any given type (i.e. multiple faults, status messages, or Degraded mode messages) the display priority for these will be on a first in, first out basis.

IV. Degraded Mode Display

Degraded Mode is simply an outcome of handling the faults as indicated per the event buckets defined previously. The system automatically enters degraded mode whenever a Function or a Function Feature becomes unavailable due to a fault. The following operator perceivable functions have been identified:

Scanner

Printer

Image Display (i.e. Edit Mode)

External Data Interface functions

User Interface

The only Function Features that have been identified are related to the Scan, Print, the External data interface, and the UI Functions. A list of the features within each of thee functions that can become unavailable is provided in sections III A (item #4), III B (item #5), and III C (item #3). Some unique display features related to handling these is as follows:

All faults which cause a function or a function feature to become unavailable are displayed in the appropriate status handler display area whether the faulted function or function feature is currently in use or not. The only exception is if the operator disables a function or a function feature via the Switches dialog. For this case, any fault related to that function or function feature is no longer be displayed in the Status Handler area.

The operator is provided with one centralized location in the interface where they can get a complete status of all system functions and function features which are currently faulted or disabled.

V. Degraded Model Event Handling

If an attempt is made to submit an object to a function which contains a faulted feature or a deconfigured feature and the function needs this feature to operate on the object, the object is faulted and prevented from entering the function.

If a function feature needed to continue an operation on an object which is currently in the function either becomes faulted or is deconfigured while the object is still in the function, the function becomes unavailable until the object is removed from the function. If the function is of the type that holds onto objects during fault conditions (e.g. Print and Scan), the operator is provided with appropriate information concerning how to make the function available again (i.e. fix the feature or; Save or Delete the object).

Several Scanner sensor faults can affect the system's ability to make the correct Document input mode selection. If a fault which affects the mode selection process is detected during power up self-test and there is no job currently in process in the Scanner, the system responds as follows:

If the RDH sensor has failed, the system automatically disables the RDH mode.

If the SADH sensor has failed, the system automatically disables the SADH mode.

If the Bar code reader has failed, the system automatically disables the bar code reading mechanism.

For the above cases, the operator is informed of the problem and the fact that a given input mode is no longer available via the sensor fault declared.

If a sensor fault occurs during normal operation, the operator is normally made aware of the problem when one of the following faults is detected:

SADH mode misfeed.

RDH mode misfeed.

"No Document to Scan" mode selection conflict message.

"Remove Document on Platen" mode selection conflict message.

The Call Avoidance information for these faults informs the operator that:

repeated fault occurrences can be the result of a hardware failure;

If the fault persistently occurs, service should be called; and

The scanner can be made available to handle certain jobs by deconfiguring the appropriate input mode via the switches interface.

A. Document Input Mode Selection Modification Requirements when an input mode is Deconfigured Document Input Mode Selection is described in copending U.S. patent application Ser. No. 07/590,580, the disclosure of which is incorporated herein by reference.

The act of deconfiguring a mode (either automatically or as a result of an operator invocation in the switches dialog) results in the following modifications to the input mode selection process:

1) If the RDH mode has been disabled, the mode selection logic always assumes that there is no paper in the RDH tray.

2) If the SADH mode is disabled, the mode selection logic assumes that there is no paper in the SADH slot unless CFF mode has been selected at the UI 52. If CFF mode has been selected, the mode selection logic assumes that there is paper in the SADH slot.

3) If the CFF mode has been disabled, the interface does not allow the CFF mode to be selected.

4) If the bar code reader has been disabled, the mode selection logic makes the following assumptions:

Case 1—After power on

If no documents are sensed in the RDH tray and the SADH slot, the mode selection logic assumes that there is a document on the platen.

If documents are sensed in either the RDH tray or the SADH slot, the mode selection logic assumes that there is no document on the platen.

Case #2 UDH has been opened and closed since the last scanning task and the UDS cover is currently closed Same as case #1 above.

Case 3—All other cases

Mode selection assumptions remain as specified in scanner mode selection charts of FIGS. 12A–12H.

The display of fault clearance and recovery instructions according to the present invention provides the operator with the ability to: (1) monitor the current fault status of the system; (2) access fault clearance and recovery instructions; and (3) avoid unnecessary service calls. Because system 2 has the ability to execute both synchronous and asynchronous operations concurrently and independently, and because this system allows the operator to create, store and work on objects in the system, the fault handling and display strategies according to the present invention greatly expand the capabilities of the system. The expanded capabilities include: 1) the ability to fault specific functions and/or function features without impacting other independent functions and/or function features; 2) the ability to fault individual operator selectable objects which exist within the system independently from faulting the hardware functions of the system; 3) the ability to inform the operator that specific synchronous operation requests have failed via a display mechanism in the user interface 52; 4) the ability to provide advanced warnings that specific asynchronous operations will fault if specific actions are not taken to prevent them; 5) the ability to display messages/faults for independent system functions in separate display areas so that the operator can focus only on the specific area of the system that needs attention; 6) the ability to provide separate and unique clearance and recovery options for system functions as opposed to the objects being operated on by the function; 7) the ability to allow the operator to fix faulted objects through the job review/edit features available within the system; and 8) the ability to allow a function with a faulted feature to continue to operate on selected objects if the object does not require the specific feature of the function that is faulted to be processed.

While this invention has been described in conjunction with the specific embodiments thereof, it is evident that many alternatives, modifications and variations will be apparent to those skilled in the art. For example, the display at user interface 52 can be updated to provide clearance and/or recovery instructions as different faults occur in the system. An illustration of when this is necessary is when certain scanner faults require that documents in the RDH be reordered. A document misfeed occurring during this reorder can require a new type of fault recovery. Accordingly, the preferred embodiments of the invention as set forth herein are intended to be illustrative, not limiting. Various changes may be made without departing the spirit and scope of the invention as defined in the following claims.

What is claimed is:

1. A method for clearance and recovery of faults in an electronic reprographic system, comprising the steps of:

storing in memory clearance and recovery instructions for specific system faults;

monitoring the system for fault occurrence during a normal system operating mode;

detecting at least two fault occurrences during the normal system operating mode;

grouping the at least two detected fault occurrences into at least one fault bucket, each fault bucket having a unique set of specific clearance and recovery instructions corresponding to the fault bucket and each fault bucket comprising a collection of faults which require the same unique set of specific clearance and recovery instructions corresponding to the fault bucket;

automatically accessing, based on at least one fault bucket, at least one unique set of specific clearance and recovery instructions corresponding to the at least one fault bucket;

automatically initiating clearance of and recovery from the at least two fault occurrences using the accessed at least one unique set of specific clearance and recovery instructions without requiring an operator to assist in restoring the system to the normal system operating mode; and automatically displaying appropriate ones of the accessed clearance and recovery instructions corresponding to the at least one fault bucket when automatic recovery from the at least two fault occurrences fails to restore the system to the normal system operating mode, the appropriate ones of the accessed clearance and recovery instructions enabling an operator to manually initiate and perform clearance and recovery.

2. The method as recited in claim 1, wherein said step of displaying clearance and recovery instructions includes displaying instructions for differing system functions in separate display areas.

3. The method as recited in claim 1, further comprising the steps of monitoring the system for predictable fault occurrences during a normal system operating mode; and automatically displaying warnings upon a determination that specific system operations will result in a fault occurrence.

4. The method as recited in claim 1, further comprising the steps of:

monitoring an input of specific operation requests into the system and performance by the system of specific operation requests; and displaying failure messages when an operation cannot be completed for any reason.

5. The method as recited in claim 1, further comprising the steps of:

identifying system functions affected by a detected fault; and continuing operation of any functions not affected by the detected fault.

6. The method as recited in claim 1, wherein the displaying step includes displaying a step-by-step series of clearance instructions.

7. The method as recited in claim 1, wherein the displaying step includes displaying particular areas of a scanner which require clearance in response to detection of a scanner fault.

8. The method as recited in claim 1, wherein said displaying step includes updating any displayed recovery instructions as different system faults are detected.

9. The method as recited in claim 1, wherein the step of automatically initiating a recovery further includes a determining step that determines if the at least two fault occurrences can be removed without the assistance of the operator, the determining step initiates the step of automatically displaying appropriate clearance and recovery instructions when assistance from the operator is necessary.

10. The method of claim 1, wherein all faults grouped in a fault bucket are cleared when the appropriate clearance and recovery instructions are executed.

11. The method of claim 1, wherein the automatically accessing step comprises the step of automatically compiling a set of unique clearance and recovery instructions from the at least one unique set of specific clearance and recovery instructions corresponding to the at least one fault bucket;

wherein the step of automatically initiating clearance of and recovery from the at least two fault occurrences comprises using the compiled set of unique clearance and recovery instructions without requiring an operator to assist in restoring the system to the normal operating mode; and wherein the step of automatically displaying appropriate ones of the accessed clearance and recovery instructions comprises displaying appropriate ones of the compiled set of unique clearance and recovery instructions when automatic recovery from the at least two fault occurrences fails to restore the system to the normal system operating mode, the appropriate ones of the compiled set of unique clearance and recovery instructions enabling an operator to manually initiate and perform clearance and recovery.

12. An apparatus for clearance and recovery of faults in an electronic reprographic system, comprising:

storage means for storing in memory clearance and recovery instructions for specific system faults;

monitoring means for monitoring the system for at least two fault occurrences during a normal system operating mode, and for detecting at least two fault occurrences;

grouping means for grouping the at least two detected fault occurrences into at least one fault bucket, each fault bucket having a unique set of specific clearance and recovery instructions corresponding to the fault bucket and each fault bucket comprising a collection of faults which require the same unique set of specific clearance and recovery instructions corresponding to the fault bucket;

accessing means for automatically accessing, based on at least one fault bucket, at least one unique set of specific clearance and recovery instructions corresponding to the at least one fault bucket;

automatic clearance and recovery means for automatically initiating clearance of and recovery from the at least two fault occurrences using the accessed at least one unique set of specific clearance and recovery instructions without requiring an operator to assist in restoring the system to the normal system operating mode; and display means for automatically displaying appropriate ones of the accessed clearance and recovery instructions corresponding to the at least one fault bucket when automatic recovery fails to restore the system to the normal system operating mode, the displaying of the appropriate ones of the accessed clearance and recovery instructions enabling an operator to manually initiate and perform clearance and recovery.

13. The apparatus as recited in claim 12, wherein said display means displays clearance and recovery instructions for differing system functions in separate display areas.

14. The apparatus as recited in claim 12, wherein:

said monitoring means monitoring the system for predictable fault occurrences during a normal system operating mode; and said display means automatically displaying warnings upon a determination that specific system operations will result in a fault occurrence.

15. The apparatus as recited in claim 12, further comprising:

said monitoring means monitoring an input of specific operation requests into the system and performance by the system of specific operation requests; and said display means displaying failure messages when an operation cannot be completed for any reason.

16. The apparatus as recited in claim 12, further comprising:

determining means for identifying system functions affected by a detected fault; and means enabling continuing operation of any functions not affected by the detected fault.

17. The apparatus as recited in claim 12, wherein said displaying means displays a step-by-step series of clearance instructions.

18. The apparatus as recited in claim 12, wherein:

said displaying means displays particular areas of a scanner which require clearance in response to detection of a scanner fault.

19. The apparatus as recited in claim 12, wherein:

said displaying means updates any displayed recovery instructions as different system faults are detected.

20. The apparatus as recited in claim 12, wherein the automatic recovery means further includes a determining means for determining if the at least two fault occurrences can be removed without the assistance of the operator, the determining means signals the display means to begin displaying appropriate clearance and recovery instructions when assistance from the operator is necessary.

21. The apparatus of claim 12, wherein:

the accessing means comprises means for automatically compiling a set of unique clearance and recovery instructions from the at least one unique set of specific clearance and recovery instructions corresponding to the at least one fault bucket;

the automatic clearance and recovery means comprises means for automatically initiating clearance of and recovery from the at least two fault occurrences using the compiled set of unique clearance and recovery instructions without requiring an operator to assist in restoring the system to the normal operating mode; and the display means comprises means for automatically displaying appropriate ones of the compiled set of unique clearance and recovery instructions when automatic recovery from the at least two fault occurrences fails to restore the system to the normal system operating mode, the appropriate ones of the compiled set of unique clearance and recovery instructions enabling an operator to manually initiate and perform clearance and recovery.

\* \* \* \* \*